(12) United States Patent
Chae et al.

(10) Patent No.: US 11,343,770 B2
(45) Date of Patent: May 24, 2022

(54) METHOD AND DEVICE FOR RECEIVING SIGNAL THROUGH T-RPT IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 16/483,327

(22) PCT Filed: Feb. 6, 2018

(86) PCT No.: PCT/KR2018/001598
§ 371 (c)(1),
(2) Date: Apr. 17, 2020

(87) PCT Pub. No.: WO2018/143781
PCT Pub. Date: Aug. 9, 2018

(65) Prior Publication Data
US 2020/0252871 A1    Aug. 6, 2020

Related U.S. Application Data

(60) Provisional application No. 62/455,546, filed on Feb. 6, 2017.

(51) Int. Cl.
*H04W 52/02* (2009.01)
*H04W 92/18* (2009.01)
(Continued)

(52) U.S. Cl.
CPC ....... *H04W 52/0229* (2013.01); *H04L 1/1614* (2013.01); *H04W 52/0274* (2013.01); *H04W 72/0446* (2013.01); *H04W 92/18* (2013.01)

(58) Field of Classification Search
CPC ......... H04W 52/0229; H04W 52/0274; H04W 72/0446; H04W 92/18; H04L 1/1614
See application file for complete search history.

(56) References Cited

U.S. PATENT DOCUMENTS

2015/0327315 A1* 11/2015 Xue ...................... H04L 5/0005
370/330
2016/0095133 A1* 3/2016 Hwang ................. H04W 8/005
370/329
(Continued)

FOREIGN PATENT DOCUMENTS

KR    10-2016-0018283 A    2/2016
WO        2016060175 A1    4/2016
(Continued)

OTHER PUBLICATIONS

ITL Inc.: "Details on signaling for T-RPT in SA", R1-143287, 3GPP TSG RAN WG1 Meeting #78, Dresden, Germany, Aug. 18-22, 2014.
(Continued)

*Primary Examiner* — Christopher M Crutchfield
*Assistant Examiner* — Tito Q Pham
(74) *Attorney, Agent, or Firm* — Dentons US LLP

(57) ABSTRACT

An embodiment of the present invention relates to a method for receiving, by a terminal, a signal of another terminal by using a time resource pattern of transmission (T-RPT) in a wireless communication system, the method comprising the steps of: determining subframes through which the another terminal transmits data, by applying a T-RPT bitmap to subframes within a physical sidelink control channel (PSCCH) period; and receiving D2D data from at least some of the subframes through which the another terminal transmits data, wherein when the terminal has received first information within the PSCCH period, the terminal switches subframes into a sleep mode according to the first informa-
(Continued)

tion even though the T-RPT bitmap indicates that data is to be transmitted through the subframes.

11 Claims, 12 Drawing Sheets

(51) Int. Cl.
    *H04L 1/16*     (2006.01)
    *H04W 72/04*     (2009.01)

(56) References Cited

U.S. PATENT DOCUMENTS

| | | | |
|---|---|---|---|
| 2016/0135143 A1* | 5/2016 | Won | H04W 12/08 370/312 |
| 2017/0215187 A1* | 7/2017 | Panteleev | H04L 5/0082 |
| 2018/0139724 A1* | 5/2018 | Loehr | H04W 72/02 |
| 2018/0206140 A1* | 7/2018 | Panteleev | H04W 72/044 |
| 2018/0206260 A1* | 7/2018 | Khoryaev | H04W 72/1263 |
| 2018/0376485 A1* | 12/2018 | Kahtava | H04W 72/10 |
| 2019/0182639 A1* | 6/2019 | Basu Mallick | H04W 72/10 |
| 2020/0337025 A1* | 10/2020 | Tang | H04W 72/04 |

FOREIGN PATENT DOCUMENTS

| | | |
|---|---|---|
| WO | 2016/163972 A1 | 10/2016 |
| WO | 2017/003156 A1 | 1/2017 |

OTHER PUBLICATIONS

Qualcomm Inc.: "T-RPT for D2D Data", R1-143981, 3GPP TSG RAN WG1 Meeting #78bis, Ljubljana, Slovenia, Oct. 6-10, 2014.

\* cited by examiner

FIG. 5
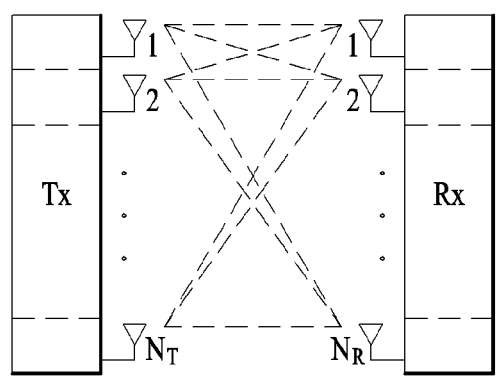
(a)
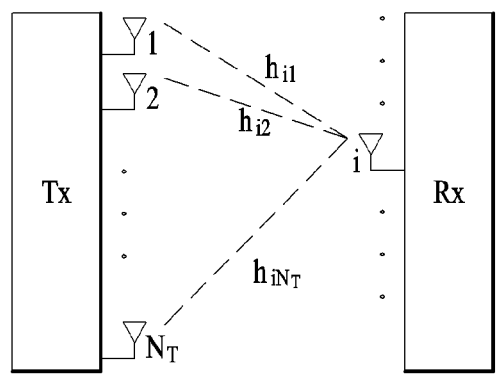
(b)

FIG. 8
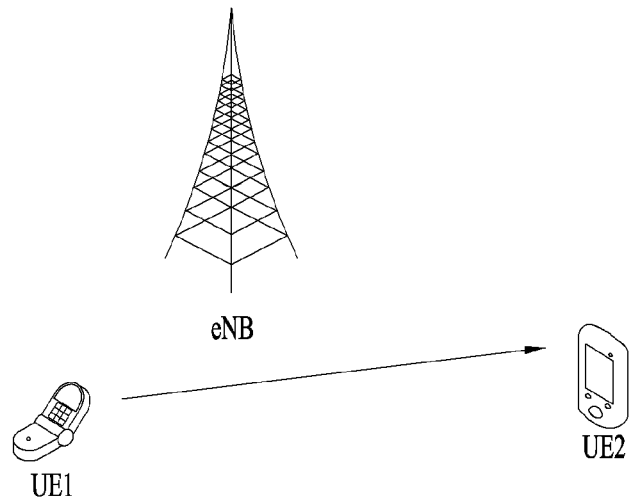
(a)
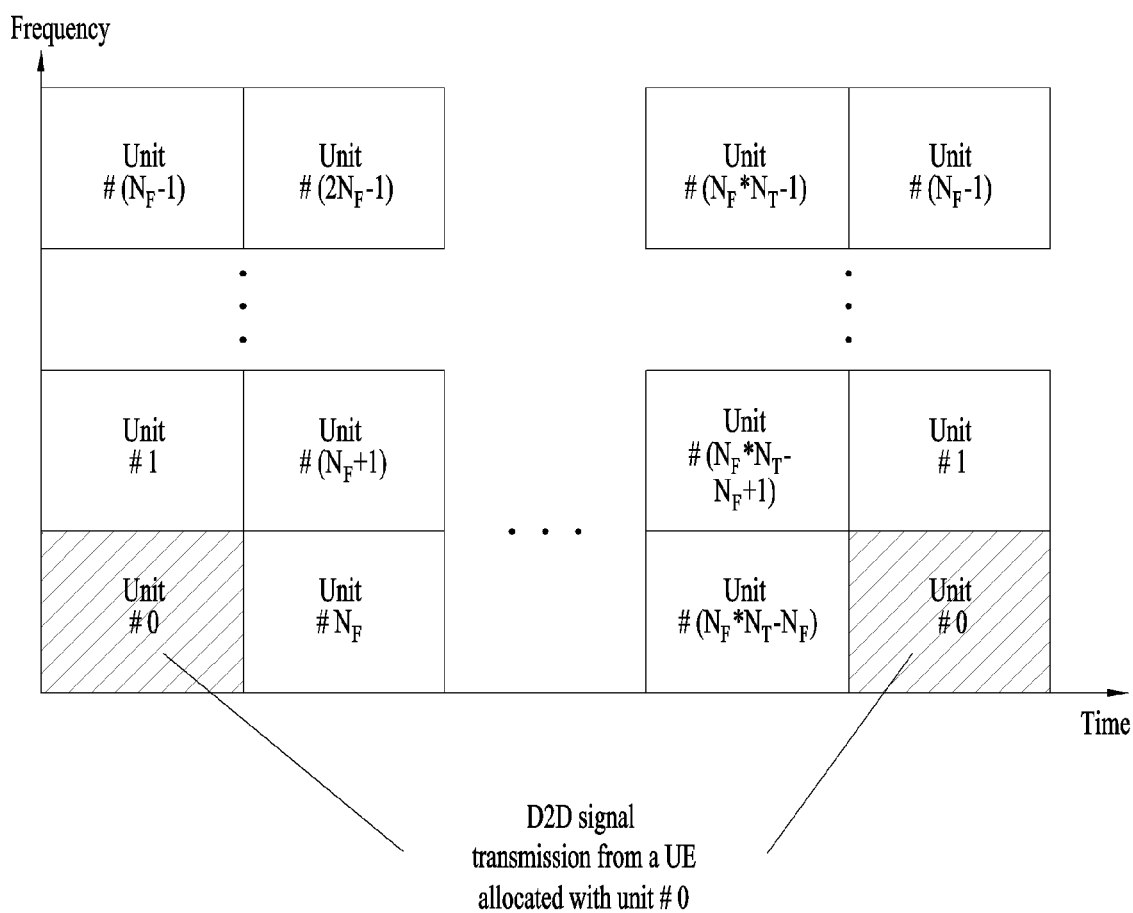
(b)

METHOD AND DEVICE FOR RECEIVING SIGNAL THROUGH T-RPT IN WIRELESS COMMUNICATION SYSTEM

TECHNICAL FIELD

The following description relates to a wireless communication system, and more particularly, to a method and apparatus for a user equipment to receive a signal of another user equipment using Time Resource Pattern of Transmission (T-RPT).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

The technical task of the present invention is to receive a signal of another user equipment through T-RPT and enter a sleep mode despite indication in the T-RPT through prescribed information.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a signal of a different user equipment using a Time Resource Pattern of Transmission (T-RPT) by a user equipment in a wireless communication system, the method including determining subframes for the different user equipment to transmit data by applying a T-RPT bitmap to subframes within a Physical Sidelink Control Channel (PSCCH) period and receiving D2D data in at least some of the subframes for the different user equipment to transmit data, wherein if the user equipment receives a first information within the PSCCH period, the user equipment switches to a sleep mode according to the first information even in a subframe for which the T-RPT bitmap indicates that data is transmitted therein.

In another technical aspect of the present invention, provided herein is a user equipment in receiving a signal of a different user equipment using a Time Resource Pattern of Transmission (T-RPT) in a wireless communication system, the user equipment including a transmitter and a receiver and a processor configured to determine subframes for the different user equipment to transmit data by applying a T-RPT bitmap to subframes within a Physical Sidelink Control Channel (PSCCH) period and receive D2D data in at least some of the subframes for the different user equipment to transmit data, wherein if the user equipment receives a first information within the PSCCH period, the user equipment switches to a sleep mode according to the first information even in a subframe for which the T-RPT bitmap indicates that data is transmitted therein.

The first information may include an information for interrupting application of the T-RPT in one of a subframe unit, a T-RPT unit and a PSCCH period unit.

The first information may include an information indicating a T-RPT repetition count.

The user equipment may maintain the sleep mode in subframes corresponding to the T-RPT repeated more than the indicated T-RPT repetition count.

The first information may include a bitmap of dividing the PSCCH period by a size of the T-RPT bitmap.

The user equipment may maintain the sleep mode in subframes corresponding to the T-RPT indicated as 0 in the bitmap.

The sleep mode may be maintained until a next PSCCH period.

The first information may indicate a last transmission within the PSCCH period.

The first information may be transmitted through a portion of a data packet.

The user equipment having received the first information may maintain the sleep mode from a next subframe of the data packet.

The first information may be transmitted through some of N data packets.

The user equipment having received the first information may maintain the sleep mode from a next subframe of a last subframe for transmitting the N data packets.

The first information may include an information indicating that T-RPT application will be interrupted in a next PSCH period.

Advantageous Effects

According to the present invention, if a transmitting user equipment has no data to transmit, the transmitting user equipment informs a receiving user equipment of the absence of data so that the receiving user equipment can switch to a sleep mode. Therefore, transmit power consumption of the receiving user equipment can be reduced.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a view illustrating the configuration of a wireless communication system having multiple antennas.

FIG. 8 is a view illustrating an exemplary D2D resource pool for D2D communication.

BEST MODE FOR INVENTION

Figure 1:
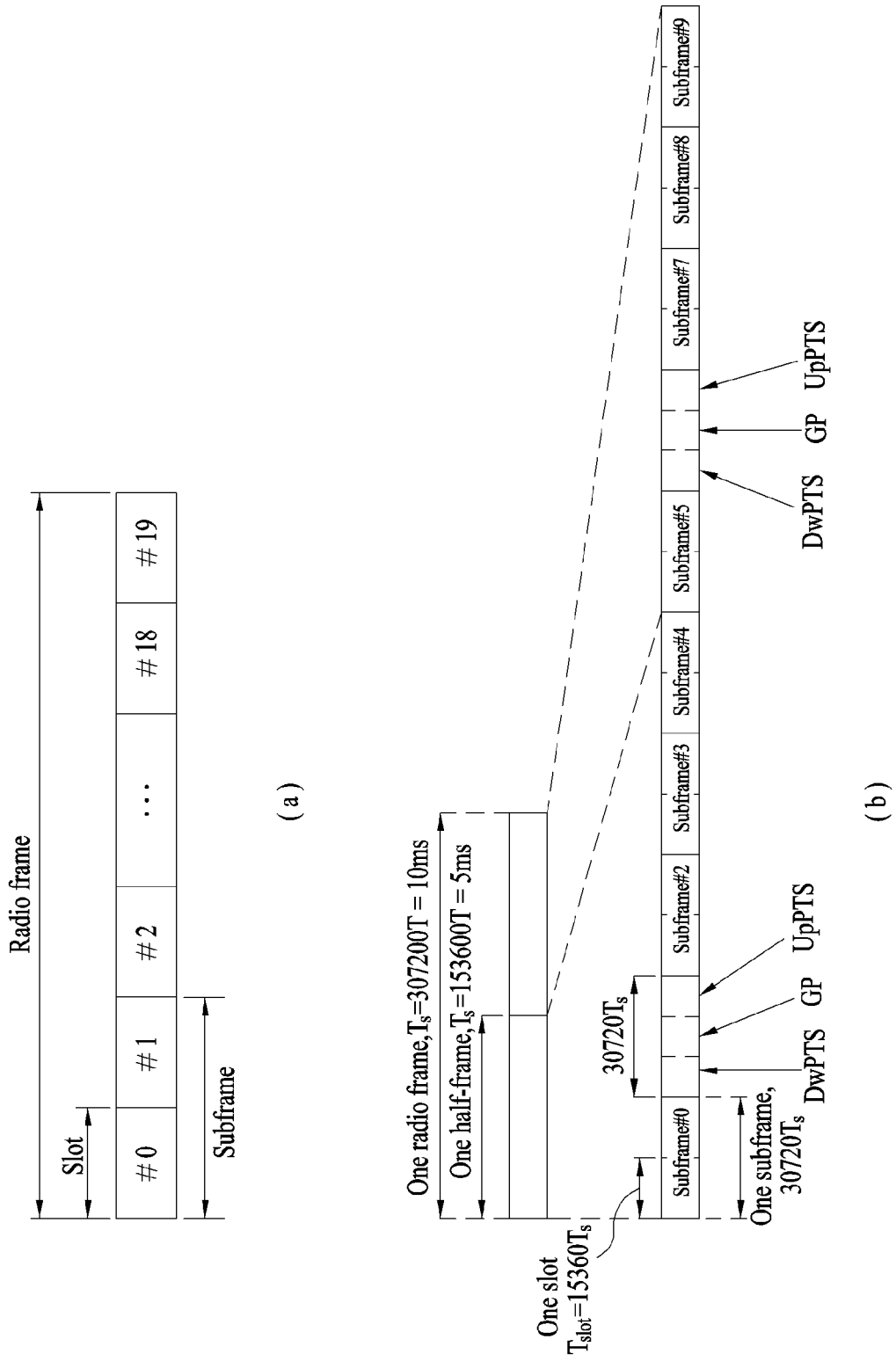
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
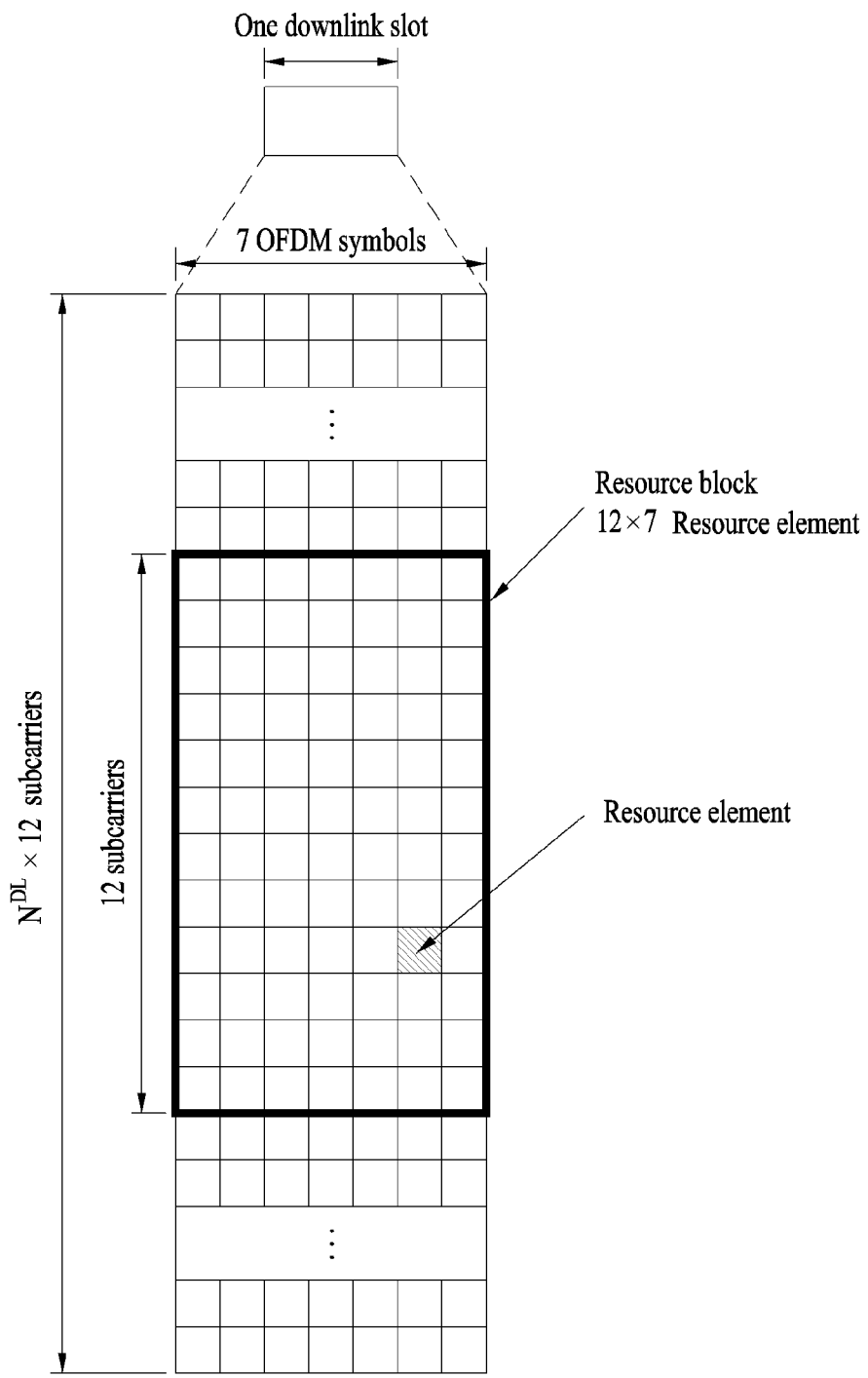
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
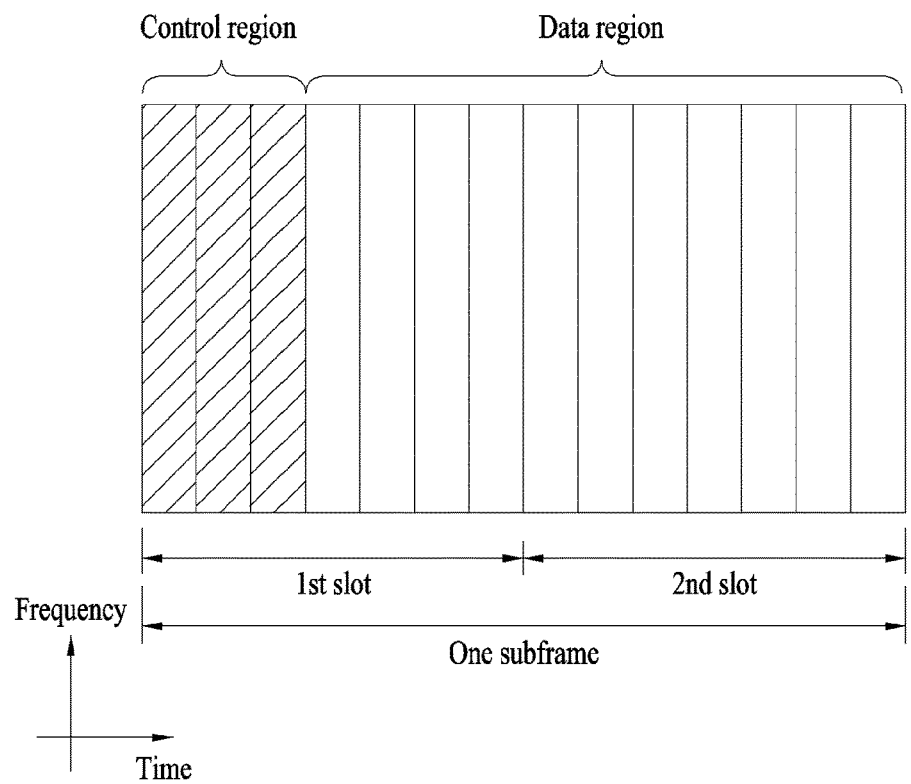
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
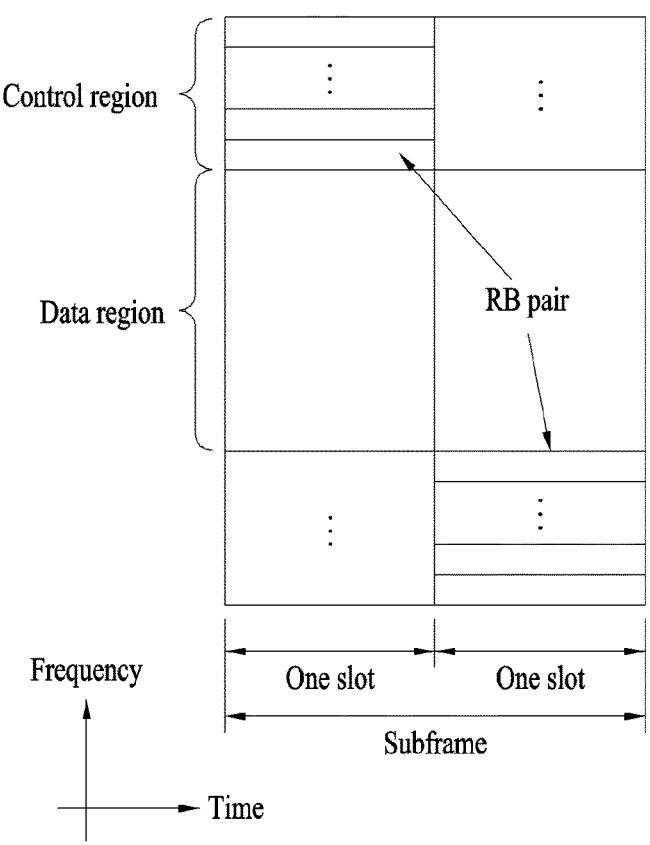
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$S = [S_1, S_2, \ldots, S_{N_T}] \quad \text{[Equation 2]}$$

Meanwhile, transmit powers can be set different from each other for individual pieces of transmission information $S_1, S_2, \ldots, S_{N_T}$, respectively. If the transmit powers are set to $P_1, P_2, \ldots, P_{N_T}$, respectively, the transmission information with adjusted transmit powers can be represented as Equation 3.

$$\hat{S} = [\hat{S}_1, \hat{S}_2, \ldots, \hat{S}_{N_T}]^T = [P_1 S_1, P_2 S_2, \ldots, P_{N_T} S_{N_T}]^T \quad \text{[Equation 3]}$$

In addition, Ŝ can be represented as Equation 4 using diagonal matrix P of the transmission power.

[Equation 4]

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector Ŝ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

-continued $$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2, \ldots y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2}, \ldots ,h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2, \ldots ,n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
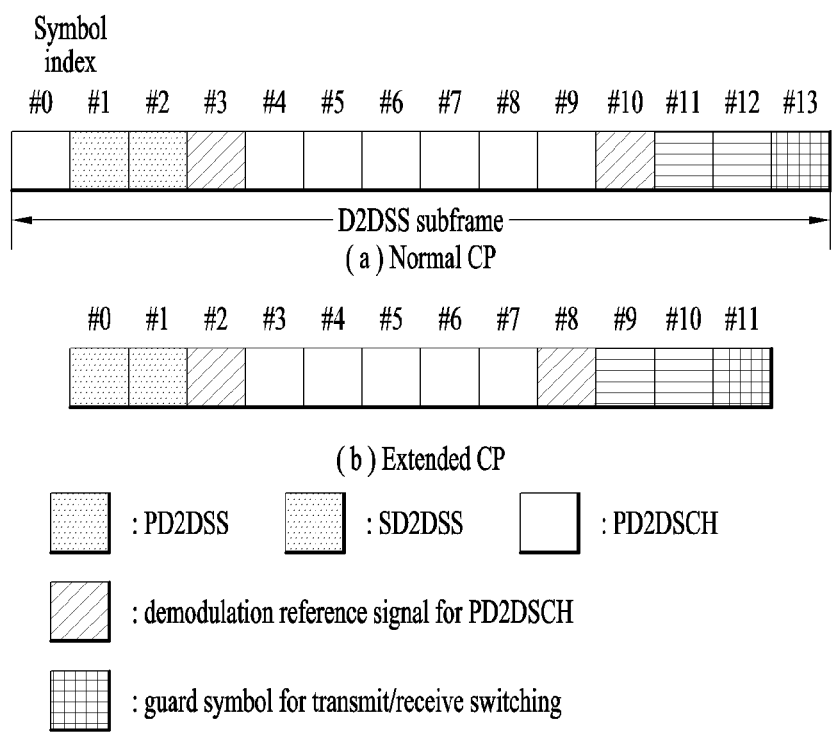
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
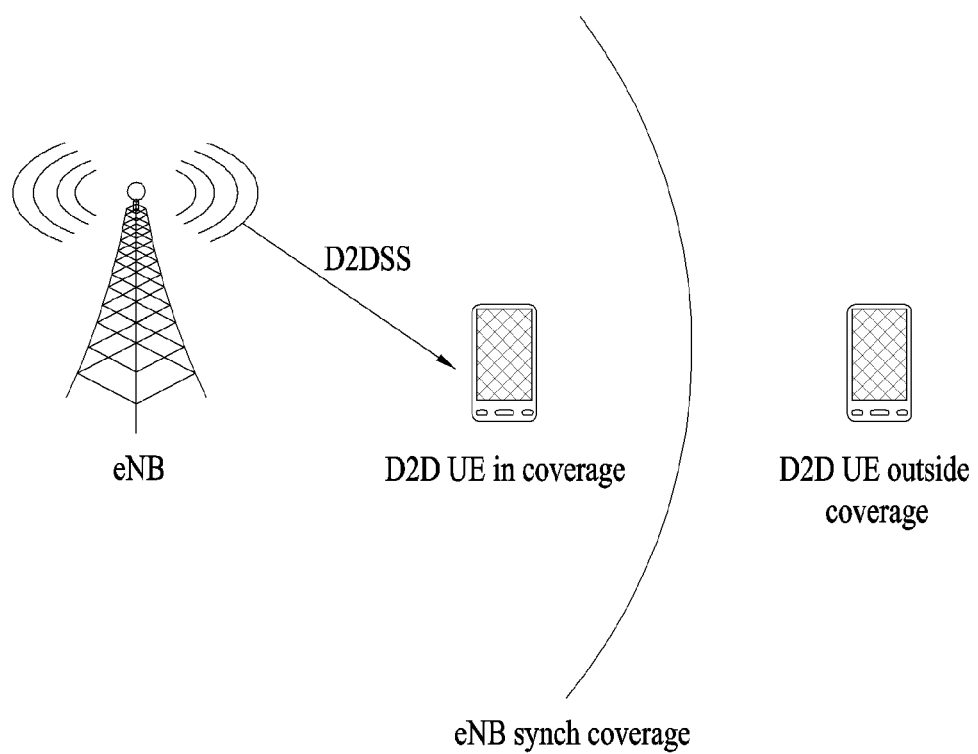
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
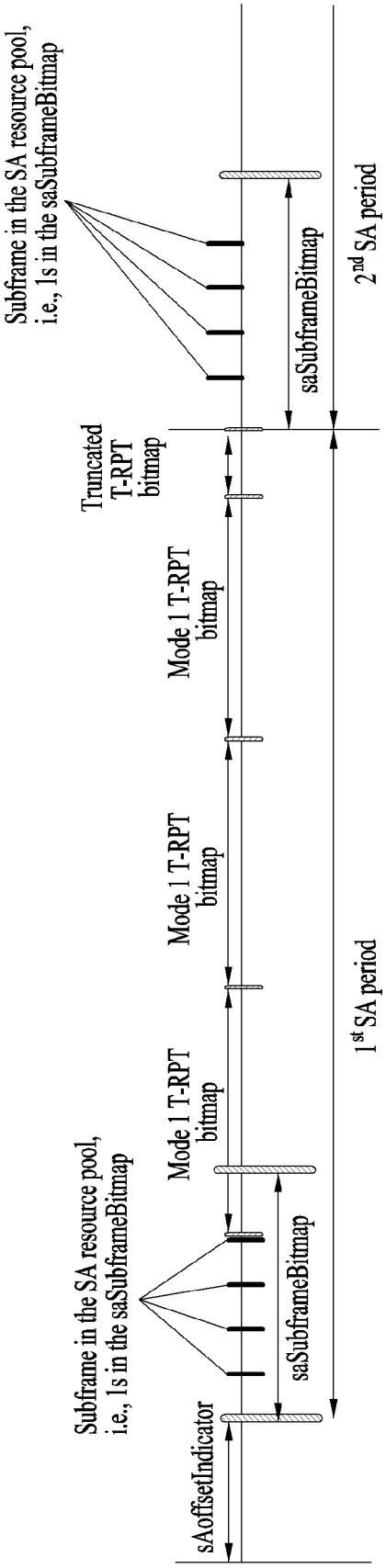
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In some implementations, in Vehicle-to-Vehicle (V2V) communication, a Cooperative Awareness Message (CAM) of a periodic message type, a Decentralized Environmental Notification Message (DENM) of an event triggered type and the like can be sent. Dynamic state information (e.g., a direction and a velocity) of a vehicle, a vehicle static data such as a size, basic vehicle information such as an external illumination state, a route history and the like can be contained in the CAM. A size of the CAM may range 50 to 300 bytes. The CAM is broadcasted and a latency should be smaller than 100 ms. The DENM may include a message created in case of an unexpected situation such as a vehicle breakdown, an accident or the like. A size of the DENM may be smaller than 3,000 bytes, and all vehicles within a transmission range can receive the corresponding message. In this case, the DENM may have a priority higher than that of the CAM. Here, having the higher priority may mean that when simultaneous transmissions occur in aspect of a single UE, a transmission having a higher priority is preferentially sent. Or, it may mean that it is intended to preferentially send a message having a high priority among several messages. In aspect of several UEs, a message of a high priority is rendered to receive interference smaller than that of a message of a low priority, whereby a reception error probability is lowered. In case that a security overhead is included, the CAM may have a message size larger than that of a case that the security overhead is not included. Regarding an embodiment of the present invention, 3GPP RAN1 #87 agreement is the related art of the present invention and can be used in a manner of being combined with the configuration of the present invention. Table 1 describes 3GPP RAN1 #87 agreement in part.

NR [New RAT (Radio Access Technology)]

As more and more communication devices require greater communication capacity, there is a need for mobile broadband communication enhanced over existing radio access technology. In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, introduction of a new radio access technology considering enhanced mobile broadband communication, massive MTC, and Ultra-Reliable and Low Latency Communication (URLLC) is being discussed. In the present invention, for simplicity, this technology will be referred to as NR.

Figure 10:
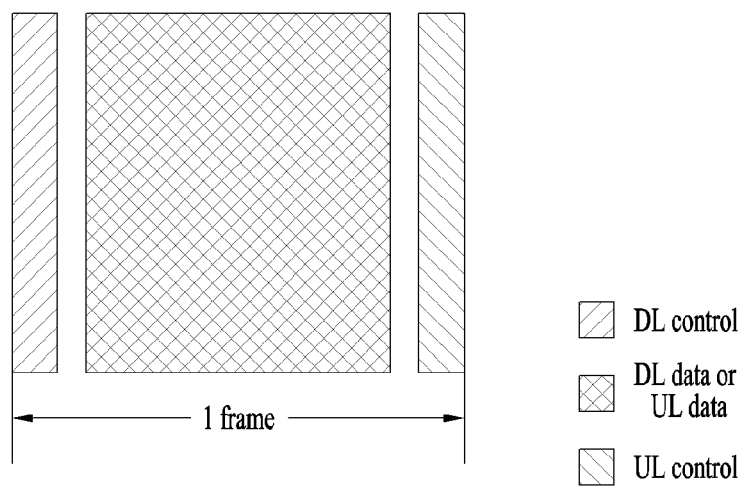
FIGS. 10 and 11 are views illustrating exemplary frame structures.
Figure 11:
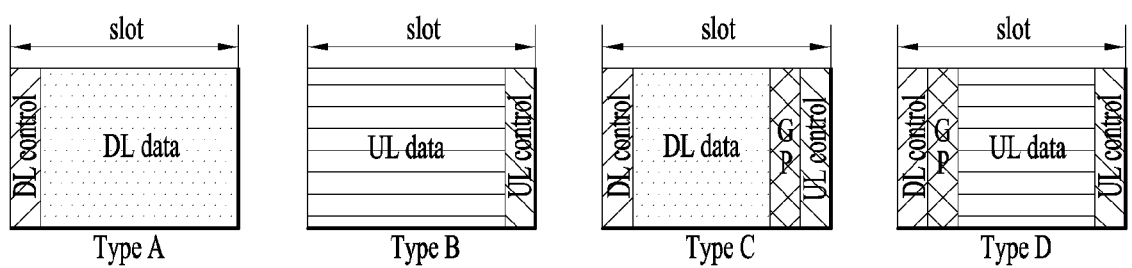

FIG. 10 shows an example of a frame structure usable for NR. Referring to FIG. 10, the frame structure of NR features a self-contained structure that can include a DL control channel, DL or UL data, and a UL control channel in one frame unit all together as shown in FIG. 2-3. Here, DL data scheduling information and UL data scheduling information can be transmitted on the DL control channel, while ACK/NACK information for DL data, CSI information (modulation and coding scheme information, MIMO transmission related information, etc.), a scheduling request and the like can be transmitted on the UL control channel A time gap for DL-to-UL or UL-to-DL switching may be present between the control region and the data region. In addition, some of DL control/DL data/UL data/UL control may not be configured in one frame. Or, the order of the channels constituting one frame may be changed (e.g., DL control/DL data/UL control/UL data or UL control/UL data/DL control/DL data).

Embodiment

Based on the aforementioned descriptions, a method for reducing power consumption in D2D communication (particularly, a remote user equipment in UE-to-Network relay communication) is described as follows.

As described above, a User Equipment (UE) in D2D communication applies PSSCH T-RPT within a PSCCH period (SA period), thereby being able to determine a subframe for another UE to transmit data. In other words, it is able to explicitly indicate a PSSCH transmitted subframe position on PSCCH. Here, the application of T-RPT is specifically to recognize that PSSCH is transmitted in a subframe corresponding to 1 (in a transmitting/receiving UE's position, PSSCH is assumed as transmitted) by applying T-RPT repeatedly to subframes within a PSSCH subframe pool (the rest of subframes except a PSCCH subframe pool within the PSCCH period) within the PSCCH period. To the subframes remaining after applying the T-RPT repeatedly, truncated T-RPTs amounting to the number of the remaining subframes are applied. Thus, having recognized/confirmed the PSSCH transmitted subframe, the UE can receive D2D data in at least some of the subframes in which another IE transmits data.

If a UE receives a first information within a PSCCH period, the UE can switch to a sleep mode according to the first information even in a subframe for which a T-RPT bitmap indicates that data is transmitted. Here, the first information has one of a subframe unit, a T-RPT unit and a PSCCH period unit and may include information for interrupting the application of T-RPT. Namely, a Transmitting (Tx) UE transmits the first information, thereby being able to indicate that its transmission will end in one of the subframe unit, the T-RPT unit and the PSCCH period unit. And, a Receiving (Rx) UE receives the first information and then enters a sleep mode according to the indication/agreement in the corresponding information, thereby reducing power consumption. Namely, if the Tx UE has no data to transmit, the Tx UE informs the Rx UE of such a fact. Thus, if the Rx UE switches to the sleep mode, the transmit power consumption of the Rx UE can be reduced.

Figure 12:
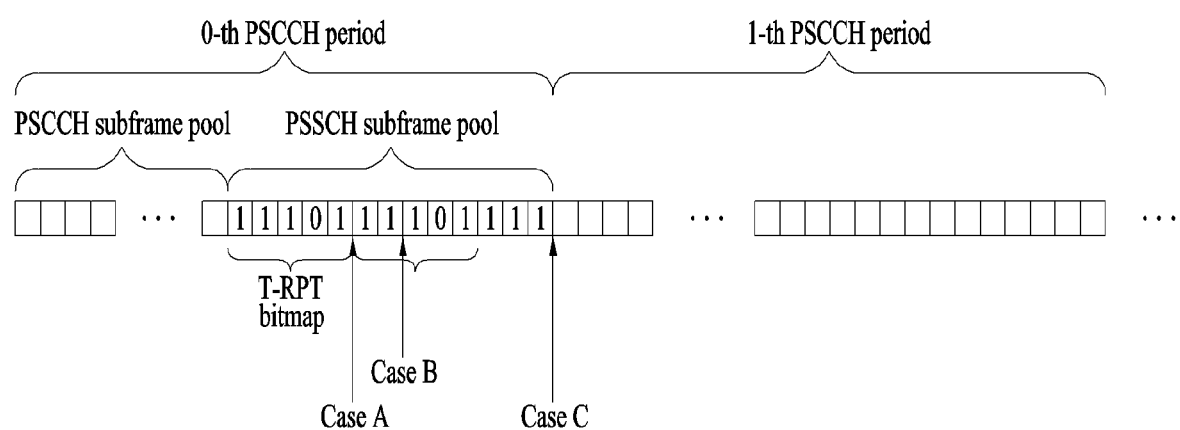
FIG. 12 is a diagram to describe an embodiment of the present invention.

In the following, as shown in FIG. 12, each case that the first information interrupts the application of T-RPT in a T-RPT unit (Case A), a subframe unit (Case B) or a PSCCH period unit (Case C) is described.

The first information may be to interrupt the application in the T-RPT unit. For example, the first information may be the information indicating a T-RPT repetition count and a UE can maintain a sleep mode in subframes corresponding to T-RPT repeated more than the T-RPT repetition count. Or, the first information may include a bitmap resulting from dividing a PSCCH period by a size of a T-RPT bitmap and a UE can maintain a sleep mode in subframes corresponding to T-RPT indicated as 0 by a bitmap. Particularly, after an SC period has been divided by a bitmap length of T-RPT, a field indicating what numberth bitmap starts to be used actually or not can be signaled through SA. Having received this packet, a UE determines that no more data will be transmitted on next transmission (subframe for which absence of transmission is indicated by T-RPT) within the corresponding SC period and is then able to maintain a sleep mode until a next SC period start. Through this, an Rx UE may not perform a receiving operation in all subframes within an SC period. Namely, an MAC PDU start and/or end point can be represented as a point at which a T-RPT starts to be mapped (applied) in an SC period or ends (or a repetition count of T-RPT). In the above description, the sleep mode can be maintained until a next PSCCH period.

Meanwhile, the first information may be to interrupt the application in the subframe unit. Namely, the first information is the information indicating a last transmission within a PSCCH period and may be transmitted through a portion of a data packet. In this case, having received the first information, a UE can maintain a sleep mode from a next subframe of a data packet. Namely, for example, information indicating that this transmission is a last transmission in a current SC period may be transmitted by being included in a partial region of a data packet using a UCI piggyback method. Or, it is able to indicate a MAC PDU transmission start and/or end point within an SC period through SA. Having received such information, a UE can maintain a sleep mode (until a next SC period). Here, the indication information related to the interruption of T-RPT may be included in a last transmitted data packet. Or, the first information may be transmitted through some of N data packets, and a UE having received the first information can maintain a sleep mode from a subframe next to a last subframe for transmitting the N data packets. In case that all data to be transmitted are transmitted in the middle of an SC period, it is able to indicate that transmissions will end soon within the corresponding SC period through a physical layer signal (e.g., the above-proposed UCI piggyback method) or a higher layer signal (MAC control signal) in N transmission subframes as well as a last packet transmission. Here, 'N' may be equal to the transmission (retransmission) count of MAC PDU or a multiple thereof, which is to indicate that a current MAC PDU is a last transmission in a transmission of a last MAC PDU or that the transmission will end at MAC PDU of a predetermined count thereafter. In such a case, it is able to solve a problem that a UE failing to receive a last packet due to half duplex constraint, strong interference and the like wakes up to attempt a reception. Meanwhile, from a relay UE's perspective, such an operation can be maintained until an SC period ends, which is to indicate that there is no MAC PDU transmission for the remaining SC period consistently for a remote UE possibly failing to receive the relay UE's signal halfway. Since the relay UE may need a transmit power saving mode relatively less than that of the remote UE in general, it performs signaling consistently for the power saving of the remote UE simply.

Subsequently, the first information may be to interrupt the application in the PSCCH period unit (SC or SA period unit). The first information may be the information indicating that T-RPT application will be interrupted in a next PSCCH period. Namely, in a previous SC period, it is able to signal that data transmission will not occur within next N SC periods. As a specific example of signaling, the signaling may be performed through PSCCH of a previous SC period or the signaling may be performed through a physical or higher layer signal on PSSCH.

As another example, through a physical or higher layer signal, it is able to signal that there is no more data to send using a separate packet after transmission of all data. In this case, a transmitted time/frequency resource may include a partial region of a time/frequency resource indicated by SA. Here, the reason why 'partial region' is represented is described as follows. Since specific control information is transmitted after the transmission of all data, all the indicated RBs may not be used for the transmission. Yet, the transmission may be made in a manner of utilizing previously indicated time and frequency resources and using a frequency resource region for a data region through zero padding for stable measurement performance. If receiving such a specific kind of packet, an Rx UE recognizes that data is not transmitted any more after the corresponding subframe and is then able to switch to a sleep mode.

As describe above, information indicating that data transmission ends within the SC period (and/or that data transmission starts (start point)) can be transmitted through the first information. Regarding the delivery of the first information, as described above, the first information can be transmitted through SA or by the UCI piggyback method. Described in the following are various examples regarding how the first information or an information having a message corresponding to the first information can be delivered. Methods described in the following are applicable to the first information or the information having the corresponding message and may be used as a method of delivering specific information in sidelink. Here, the specific information includes the number of MAC PDUs transmitted in the corresponding SC period, a data transmission count, a repetition count of T-RPT, etc.

As a first method, it is able to deliver specific information by configuring data and/or a DMRS base sequence of SA and/or CS (cyclic shift) differently. Particularly, a DMRS base sequence and/or CS in a data transmitted subframe can be configured differently from a conventional method (a method derived from ID of SA). For example, a CS can be additionally shifted by +x more than the previous (here, x may be determined in advance).

As a second method, it is able to deliver specific information by configuring ID included in SA (PSCCH) differently. Namely, an ID or ID group transmitted by being included in SA may be linked to a MAC PDU transmitted in a corresponding SC period or the data transmission subframe number. For example, when a specific ID group is assigned to a UE of a specific group and a specific ID among the IDs is transmitted, assume that transmission occurs in all indicated data subframes of an SC period. When another specific ID is transmitted, it is able to assume that transmission occurs in half of data subframes (e.g., a front half of the SC period) within the SC period. Such relation may be determined in advance, signaled to a UE by a network through a physical or higher layer signal, or signaled to another UE by a Tx UE, a UE playing a role as a leader of a group, a synchronization signal transmitting UE or a relay performing UE through a physical or higher layer signal.

As a third method, it may be able to indicate specific information (e.g., the number of MAC PDUs transmitted in a corresponding SC period or a data transmission count) using a prescribed unused field of PSCCH (e.g., TA field in Mode 2).

As a fourth method, CRC of data can be configured differently. For example, CRC of data can be masked with a bit sequence for specific information indication.

As a fifth method, a prescribed region of a data RE can be rate-matched or punctured in a manner similar to the UCI piggyback method so as to include specific information. According to this method, the specific information can be transmitted in a manner similar to the existing manner that CQI or PMI/RI is UCI piggybacked. In this case, a first symbol and a last symbol can be exempted from transmitting such information. Namely, a first symbol of a D2D subframe may be impossible for data reception due to AGC and a last symbol may be used as a guard period by puncturing.

As another method, it is able to consider a method of transmitting specific control information on a MAC control channel or a prescribed region of a header. Or, specific information can be transmitted through a control signal of an upper layer over MAC. Specific information can be delivered through SA together with the above methods or independently.

A PSCCH blind decoding method for reducing UE's power consumption, which is to be applied together with or independently from the above description, is described as follows.

In case of a (remote) UE pursuing extremely small power consumption like a wearable or IoT UE, a blind decoding count of a UE can be set smaller than that of an existing UE. In this case, the blind decoding count may be designated to a specific type/category UE. A relay UE should determine how much of blind decoding capability an Rx UE has. In a relay discovery step, such UE type information or information on PSCCH blind decoding capability can be transmitted by being included in a discovery signal entirely or in part. Or, such information may be signaled between a relay UE and a remote UE as a higher layer signal in case of a relay path setup.

Meanwhile, a UE transmitting a signal to a UE pursuing a lower power consumption may have a transmission band limited to a specific size (e.g., 6 RBs or less), and a position of a band used for transmission to a specific UE or UE group may be determined in advance or indicated by a relay UE. In this case, a transmission band of PSCCH may be predetermined per UE or UE group or signaled to a remote UE by a relay UE through a physical or upper layer signal. To this end, a PSCCH pool in size of 6 RBs or less of PSCCH can be configured.

A transmission band (e.g., 6RB subband) in a single SC period can be signaled through PSCCH. In doing so, frequency hopping may be performed within a subband, and a presence or non-presence of performing frequency hopping and a subband size may be predetermined or signaled by a Tx UE or a relay UE through a physical or higher layer signaling.

Hopping within a subband may be disabled. This is because frequency hopping within 6 RBs may provide an insignificant gain. Whether hopping within a subband is disabled may be predetermined or signaled by a network through a physical or higher layer signal.

Meanwhile, in case of a remote UE, for a low power operation, a rule may be determined in a manner that only a signal subband is received at one timing point or within a single subframe or a single SC period. In such a case, inter-subband hopping may be allowed. Particularly, a sidelink bandwidth is divided into several subbands, and a size of the subband can be interpreted as the same of a subband of the existing type-2 PUSCH hopping. For example, a subband in 6-RB unit (or less) can be configured for a low-power remote UE and an MTC UE can perform inter-subband hopping.

If it is unable to receive several subbands in a single SC period from a remote UE's perspective, transmissions may be performed simultaneously from a relay UE's perspective. In doing so, if T-RPT is selected so as to perform transmission on several subbands divided in a frequency domain within a single subframe, single carrier property is broken to degrade transmission coverage. Yet, in case of a wearable UE, if it is able to assume that the wearable device is always located in a close distance from a relay UE, PAPR increases to decrease a coverage, which can be regarded as an insignificant effect. Hence, it is able to assume that the relay UE can schedule discontinuous RBs in several frequency regions according to implementation of UE.

Yet, in order to avoid a problem of selecting several discontinuous RBs from a single subframe, a rule may be determined so that some RBs among a predetermined number of discontinuous RBs or more are dropped according to the implementation of UE. As another method, a rule may be determined so that a relay UE selects T-RPT not to perform transmission at the same subframe position when selecting T-RPT within each subband FDMed in a frequency domain according to the implementation of UE. For example, when a relay UE simultaneously performs transmissions within 2 subbands, T-RPTs are respectively selected from the subbands in a manner that positions of 1 are misaligned with each other.

Meanwhile, in order to extremely decrease a PSCCH blind decoding count of a UE, a remote UE for which a relay path is set once may consider a method that a PSCCH resource hops in a specific pattern in each SC period. In this case, the hopping pattern of the PSCCH resource may be linked to an ID of a relay UE and/or a remote UE. Or, a semi-persistent PSCCH transmission, in which a specific PSCCH resource is maintained for a predetermined time, is proposed instead of hopping. For example, if a relay UE selects a PSCCH resource once, the selected resource is maintained for N SC periods. In this case, information indicating how SC periods the same PSCCH resource will be maintained for or whether the same PSCCH resource will be used in a next SC period may be signaled through PSCCH, or whether the PSCCH resource will be maintained in a next SC period can be indicated through one (e.g., a method of changing PSCCH DMRS CS) of the aforementioned physical layer signaling methods.

Such an inter-SC period semi-persistent scheduling method is applicable to PSSCH as well as to PSCCH only. In case of selecting a PSSCH transmission resource once, a relay UE and/or a remote UE can maintain it for a predetermined SC period. As described above, information indicating how many SC periods the selected resource will be maintained and/or whether the selected resource will be maintained in a next SC period can be signaled to an Rx UE through a physical layer (e.g., PSCCH) or a higher layer signal (e.g., MAC CE).

In the above description, a method for announcing an early end in an SC period may be usable to indicate an actual transmission start point of PSSCH entirely or in part. By indicating a start point of data transmission on PSCCH as well as indicating that data transmission will end early in an SC period, an Rx UE wakes up and receives data when an actual data transmission starts, whereby battery consumption of the Rx UE can be reduced.

The above descriptions are non-limited to D2D direct communication only but usable in uplink or downlink. In doing so, a base station, a relay node or the like can use the above-proposed method.

As examples for the aforementioned proposed schemes can be included as one of the implemented methods of the present invention, they can be apparently regarded as a sort of proposed schemes. Although the aforementioned proposed schemes can be implemented independently, they can be implemented in form of combination (or mergence) entirely or in part. A rule can be defined in a manner that a base station informs a UE of applicability information of the proposed methods (or, information on rules of the proposed methods) through predefined signaling (e.g., physical layer signaling, higher layer signaling), that a Tx UE signals the applicability information to an Rx UE, or that the Rx UE makes a request for the applicability information to the Tx UE.

Device Configuration According to Embodiment of Present Invention

Figure 13:
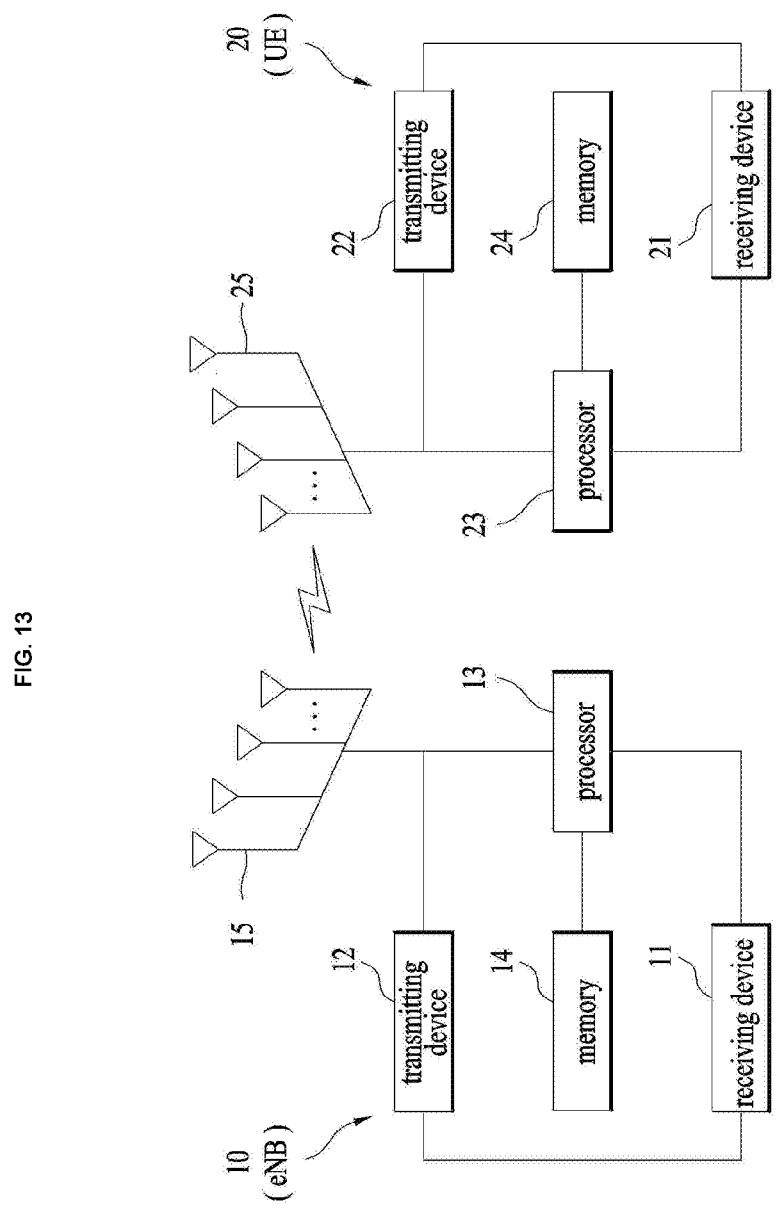
FIG. 13 is a diagram showing configuration of a transceiver device.

FIG. 13 is a diagram showing the configuration of a transmitting point device and a user equipment device according to an embodiment of the present invention.

Referring to FIG. 13, a transmitting point device 10 according to the present invention may include a receiving device 11, a transmitting device 12, a processor 13, a memory 14 and a plurality of antennas 15. A plurality of the antennas 15 may mean a transmitting point device supportive of MIMO transmission and reception. The receiving device 11 can receive various signals, data and information in uplink from a user equipment. The transmitting device 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and be substituted with such a component as a buffer (not) and the like.

Referring still to FIG. 13, a user equipment device 20 according to the present invention may include a receiving device 21, a transmitting device 22, a processor 23, a memory 24 and a plurality of antennas 25. A plurality of the antennas 25 may mean a user equipment device supportive of MIMO transmission and reception. The receiving device 21 can receive various signals, data and information in downlink from a transmitting point. The transmitting device 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description. Particularly, the processor determines subframes for another UE to transmit data therein by applying a T-RPT (Time Resource Pattern of Transmission) bitmap to subframes in a PSCCH (Physical Sidelink Control Channel) period and receives D2D data in at least some of the subframes in which the another UE transmits data. If the UE receives a first information in the PSCCH period, the UE can switch to a sleep mode according to the first information even in a subframe for which the T-RPT bitmap indicates that data is transmitted therein.

The processor 23 of the user equipment device 20 performs functions of operating and processing information received by the user equipment device 20, information to be transmitted by the user equipment device 20, and the like. The memory 24 can store the operated and processed information and the like for a prescribed period and be substituted with such a component as a buffer (not shown) and the like.

In the above-mentioned specific configurations of the transmitting point device and the user equipment device, the contents or items explained in the descriptions of the various embodiments of the present invention may be independently applicable or two or more embodiments of the present invention may be simultaneously applicable. And, redundant descriptions shall be omitted from the following description for clarity.

Moreover, the description of the transmitting point device 10 with reference to FIG. 13 may be identically applicable to a relay node device as a DL transmitting entity or a UL receiving entity. And, the description of the user equipment device 20 with reference to FIG. 15 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of receiving a signal from a different user equipment using a Time Resource Pattern of Transmission (T-RPT) by a user equipment in a wireless communication system, the method comprising:
   determining subframes for the different user equipment to transmit data by applying a T-RPT to subframes within a Physical Sidelink Control Channel (PSCCH) period; and
   receiving D2D data in at least some of the determined subframes,
   wherein based on the user equipment receiving first information within the PSCCH period, the user equipment switches to a sleep mode according to the first information even in a subframe for which the T-RPT indicates that data is transmitted therein,
   wherein the first information comprises information for interrupting application of the T-RPT in units of one of a subframe, a size of T-RPT and a PSCCH period,
   wherein the first information comprises information indicating a T-RPT repetition count, and
   wherein the user equipment maintains the sleep mode in subframes corresponding to the T-RPT being repeated more than the indicated T-RPT repetition count.

2. The method of claim 1, wherein the first information comprises a bitmap dividing the PSCCH period by a size of the T-RPT.

3. The method of claim 2, wherein the user equipment maintains the sleep mode in subframes corresponding to the T-RPT indicating a 0 in the bitmap.

4. The method of claim 1, wherein the sleep mode is maintained until a next PSCCH period.

5. The method of claim 1, wherein the first information includes information indicating a last transmission within the PSCCH period.

6. The method of claim 5, wherein the first information is transmitted through a portion of a data packet.

7. The method of claim 6, wherein the user equipment having received the first information maintains the sleep mode from a next subframe of the data packet.

8. The method of claim 1, wherein the first information is transmitted through some of N data packets.

9. The method of claim 8, wherein the user equipment having received the first information maintains the sleep mode from a next subframe to a last subframe for transmitting the N data packets.

10. The method of claim 1, wherein the first information comprises an information indicating that T-RPT application will be interrupted in a next PSCCH period.

11. A user equipment configured to receive a signal from a different user equipment using a Time Resource Pattern of Transmission (T-RPT) in a wireless communication system, the user equipment comprising:
    a transmitter and a receiver; and
    a processor configured to determine subframes, for the different user equipment to transmit data, by applying a T-RPT to subframes within a Physical Sidelink Control Channel (PSCCH) period and receive D2D data in at least some of the determined subframes,
    wherein based on the processor receiving first information within the PSCCH period, the processor is further configured to switch the user equipment to a sleep mode according to the first information even in a subframe for which the T-RPT indicates that data is transmitted therein,
    wherein the first information comprises information for interrupting application of the T-RPT in units of one of a subframe, a size of T-RPT and a PSCCH period,
    wherein the first information comprises information indicating a T-RPT repetition count, and
    wherein the processor is further configured to maintain the user equipment maintains in the sleep mode in subframes corresponding to the T-RPT being repeated more than the indicated T-RPT repetition count.

* * * * *